(12) United States Patent
Michelson et al.

(10) Patent No.: US 7,016,305 B1
(45) Date of Patent: Mar. 21, 2006

(54) METHOD AND APPARATUS FOR DISTRIBUTING INFORMATION WITHIN A PACKET SWITCHING SYSTEM

(75) Inventors: Jonathan E. Michelson, Sunnyvale, CA (US); John J. Williams, Jr., Pleasanton, CA (US); Thomas Dejanovic, Sunnyvale, CA (US)

(73) Assignee: Cisco Technology, Inc, San Jose, CA (US)

( * ) Notice: Subject to any disclaimer, the term of this patent is extended or adjusted under 35 U.S.C. 154(b) by 900 days.

(21) Appl. No.: 09/894,200

(22) Filed: Jun. 27, 2001

(51) Int. Cl.
*H04L 12/56* (2006.01)

(52) U.S. Cl. ...................... 370/236; 370/389

(58) Field of Classification Search ............... 370/388, 370/229–230
See application file for complete search history.

(56) References Cited

U.S. PATENT DOCUMENTS

| | | | |
|---|---|---|---|
| 4,491,945 | A | 1/1985 | Turner |
| 4,494,230 | A | 1/1985 | Turner |
| 4,630,260 | A | 12/1986 | Toy et al. |
| 4,734,907 | A | 3/1988 | Turner |

(Continued)

OTHER PUBLICATIONS

Jonathan S. Turner, "An Optimal Nonblocking Multicast Virtual Circuit Switch," Jun. 1994, Proceedings of Infocom, 8 pages.
Chaney et al., "Design of a Gigabit ATM Switch," Feb. 5, 1996, WUCS-96-07, Washington University, St. Louis, MO, 20 pages.

(Continued)

*Primary Examiner*—Chi Pham
*Assistant Examiner*—Anh-Vu H Ly
(74) *Attorney, Agent, or Firm*—The Law Office of Kirk D. Williams

(57) ABSTRACT

Methods and apparatus are disclosed for distributing flow control information in a packet switching system. In one packet switching system, flow control information is collected in a data structure in the first stage switching elements. Each of these switching elements transmit data from the flow control data structure as small messages or in fields included in packets being sent across multiple statically allocated paths. Flow control information is received by next stage elements, which are programmed to forward only flow control information received from a limited number of components or over a limited number of paths. The first stage switching elements may also periodically or occasionally delay sending flow control information or send a dummy message or information to accommodate bandwidth transmission differences between components of the packet switching system, including to accommodate bandwidth variations caused by plesiochronous timing across the network.

8 Claims, 21 Drawing Sheets

U.S. PATENT DOCUMENTS

| | | |
|---|---|---|
| 4,829,227 A | 5/1989 | Turner |
| 4,849,968 A | 7/1989 | Turner |
| 4,893,304 A | 1/1990 | Giacopelli et al. |
| 4,901,309 A | 2/1990 | Turner |
| 5,127,000 A | 6/1992 | Henrion |
| 5,173,897 A | 12/1992 | Schrodi et al. |
| 5,179,551 A | 1/1993 | Turner |
| 5,179,556 A | 1/1993 | Turner |
| 5,229,991 A | 7/1993 | Turner |
| 5,253,251 A | 10/1993 | Aramaki |
| 5,260,935 A | 11/1993 | Turner |
| 5,339,311 A | 8/1994 | Turner |
| 5,402,415 A | 3/1995 | Turner |
| 5,493,566 A * | 2/1996 | Ljungberg et al. .......... 370/231 |
| 5,689,500 A * | 11/1997 | Chiussi et al. .............. 370/235 |
| 5,842,040 A | 11/1998 | Hughes et al. |
| 6,157,643 A * | 12/2000 | Ma ............................. 370/389 |
| 6,654,342 B1 * | 11/2003 | Dittia et al. ................. 370/229 |
| 6,728,211 B1 * | 4/2004 | Peris et al. .................. 370/235 |
| 6,735,173 B1 * | 5/2004 | Lenoski et al. ............. 370/235 |

OTHER PUBLICATIONS

Turner et al., "System Architecture Document for Gigabit Switching Technology," Aug. 27, 1998, Ver. 3.5, ARL-94-11, Washington University, St. Louis, MO, 110 pages.

* cited by examiner

METHOD AND APPARATUS FOR DISTRIBUTING INFORMATION WITHIN A PACKET SWITCHING SYSTEM

FIELD OF THE INVENTION

This invention relates to a packet switching systems; and more particularly, the invention relates to distributing information, especially flow and other control information, within a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

Under certain circumstances and typically for a limited duration, these switching systems can have internal congestion as well as congestion at the output ports. The amount of the congestion can be decreased if the ports sending packets over the congested paths or to the congested output ports stop or decrease sending packets for a period of time. A mechanism is needed to provide flow control information to the sending ports.

Many prior communications systems, such as early routers and switches, were typically bus based with no internal buffering. In such systems, when there was congestion, either the output line cards would drop cells locally or the output line cards would send messages back to the input line cards informing them of the congestion. Such systems either sent a broadcast message for each flow control data item, or sent multiple messages. Such techniques required a significant amount of bandwidth. New methods and apparatus are needed to efficiently communicate control and other information within a packet switching system.

SUMMARY OF THE INVENTION

Systems and methods are disclosed for distributing information within a packet switching system. One embodiment includes multiple first components, multiple second components, and multiple paths between each of the first components and each of the second components. Each of these multiple first components includes a storage device for storing received information, and control logic for receiving information and for updating the storage device with indications of the received information. Each of the first components is configured to sequence through a portion of the storage device, and to send information stored at a current location within the portion of the storage device over the multiple paths to each of the second components. Each of the second components receives information sent from each of the first components, and each of the of second components is programmed to forward information received from a particular one of the first components.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
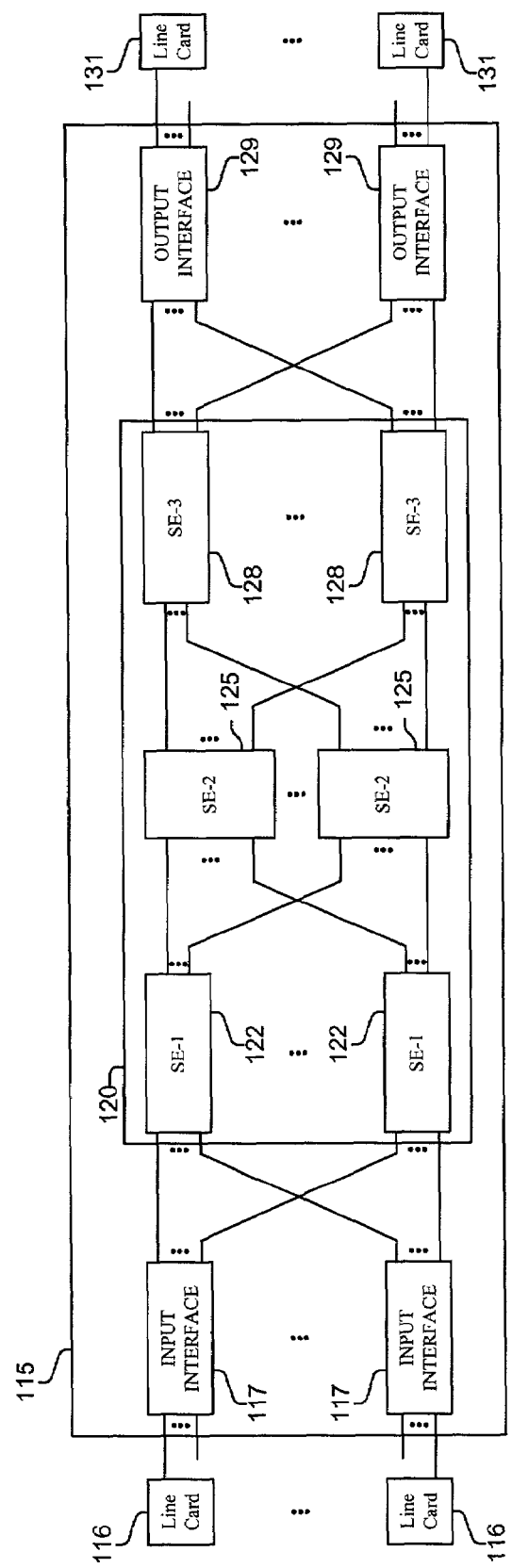
FIGS. 1A–C are block diagrams of exemplary embodiments of packet switching systems distributing information according to the invention.

Methods and apparatus disclosed herein are used to collect and distribute information within a packet switching system. The types of information that can be collected and/or distributed in the manners disclosed herein are unbounded. Embodiments typically distribute information and data, such as, but not limited to flow control, status, maintenance, provisioning, trouble, traffic, data, and operations information. The methods and apparatus disclosed herein are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, networks, computer and/or communication devices or mechanisms, or combinations of components thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Methods and apparatus are disclosed for distributing information in a packet switching system. In one embodiment of a packet switching system, flow and/or other control information is collected in a data structure in the first stage switching elements. Each of these switching elements transmit data from the data structure as small messages or in fields included in packets being sent across multiple statically allocated paths. The information is received by next stage elements, which are programmed to forward only information received from a limited number of components or over a limited number of paths. The first stage switching elements may also periodically or occasionally delay sending information or send a dummy message or information to accommodate bandwidth transmission differences between components of the packet switching system, including to accommodate bandwidth variations caused by plesiochronous timing across the network.

In one embodiment, non-first stage switching elements do not reconstruct the entire data structure. Rather, these switching elements are programmed to forward received flow control and other information towards the traffic sources or other destinations. In one embodiment, "just in time" forwarding is done by forwarding messages as they arrive from the a previous stage switching elements. For example, in a three-stage Benes network, each second stage switching element broadcasts the flow control information received from a limited number of first stage switching elements with minimum internal delay. In one embodiment, this limited number is one. In one embodiment, each first stage element forwards flow control information to each second stage switching element, however, each second stage switching element only forwards flow control information received from a single or other limited number designated first stage switching elements (or that received over one or more designated routes), as a second stage switching element will receive the ignored flow control information over another path and from a different first stage switching element. In one embodiment, each third stage switching element performs in a manner similar to that described for the second stage switching elements. Using this technique, the data structure is typically only reconstructed at the consumer of the information.

FIGS. 1A–3C and their discussion herein are intended to provide a description of a few of the numerous variety of embodiments which distribute information according to the invention. FIGS. 1A–C illustrate a few of many embodiments including different packet switching systems and topologies thereof. FIG. 1A illustrates an exemplary packet switch 115 having multiple inputs and outputs and a single interconnection network 120. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 115, 140 and 160 and line cards to which they are connected distribute information as disclosed herein, including, but not limited to the apparatus and processes described in relation to FIGS. 4A–8B, and using variants thereof which are also within the scope and spirit of the present invention. Of course, the invention is not limited to these illustrated operating environments and packet switching systems, and the packet switching systems may have more or less elements.

FIG. 1A illustrates an exemplary embodiment of a packet switch 115. Packet switch 115 comprises multiple input interfaces 117, interconnection network 120, and output interfaces 129. Input interfaces 117 and output interfaces 129 are both coupled over multiple links to interconnection network 120. Line cards 116 and 131 are coupled to input interfaces 117 and output interfaces 129. In some embodiments including other packet switching topologies, line cards or their functionality may be included in the packet switch itself, or as part of the packet switching system.

In one embodiment, interconnection network 120 comprises multiple switch elements SE-1 122, SE-2 125, and SE-3 128 that are interconnected by multiple links. Line cards 116 and 131 may connect to other systems (not shown) to provide data items (e.g., packets) to be routed by packet switch 115. Embodiments distribute information according to the invention in one or more components, including line cards 116, 131, input interfaces 117, switch elements SE-1 122, SE-2 125, and SE-3 128, output interfaces 129, and/or other locations within packet switch 115 or the packet switching system.

Figure 1B:
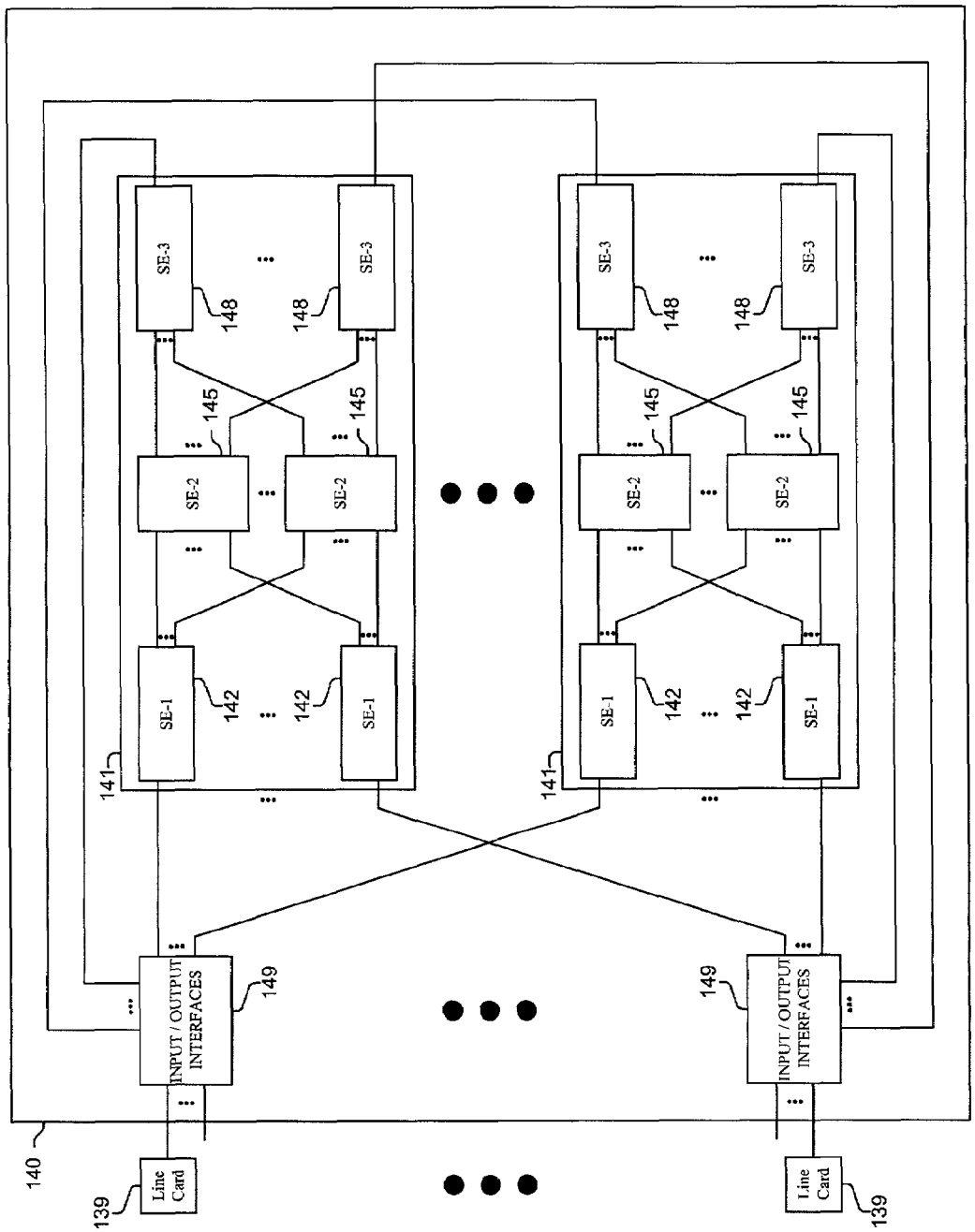

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Embodiments distribute information according to the invention in one or more components, including line cards 139, input and output interfaces 149, switch elements SE-1 142, SE-2 145, and SE-3 148, and/or other locations within packet switch 140 or the packet switching system.

Figure 1C:
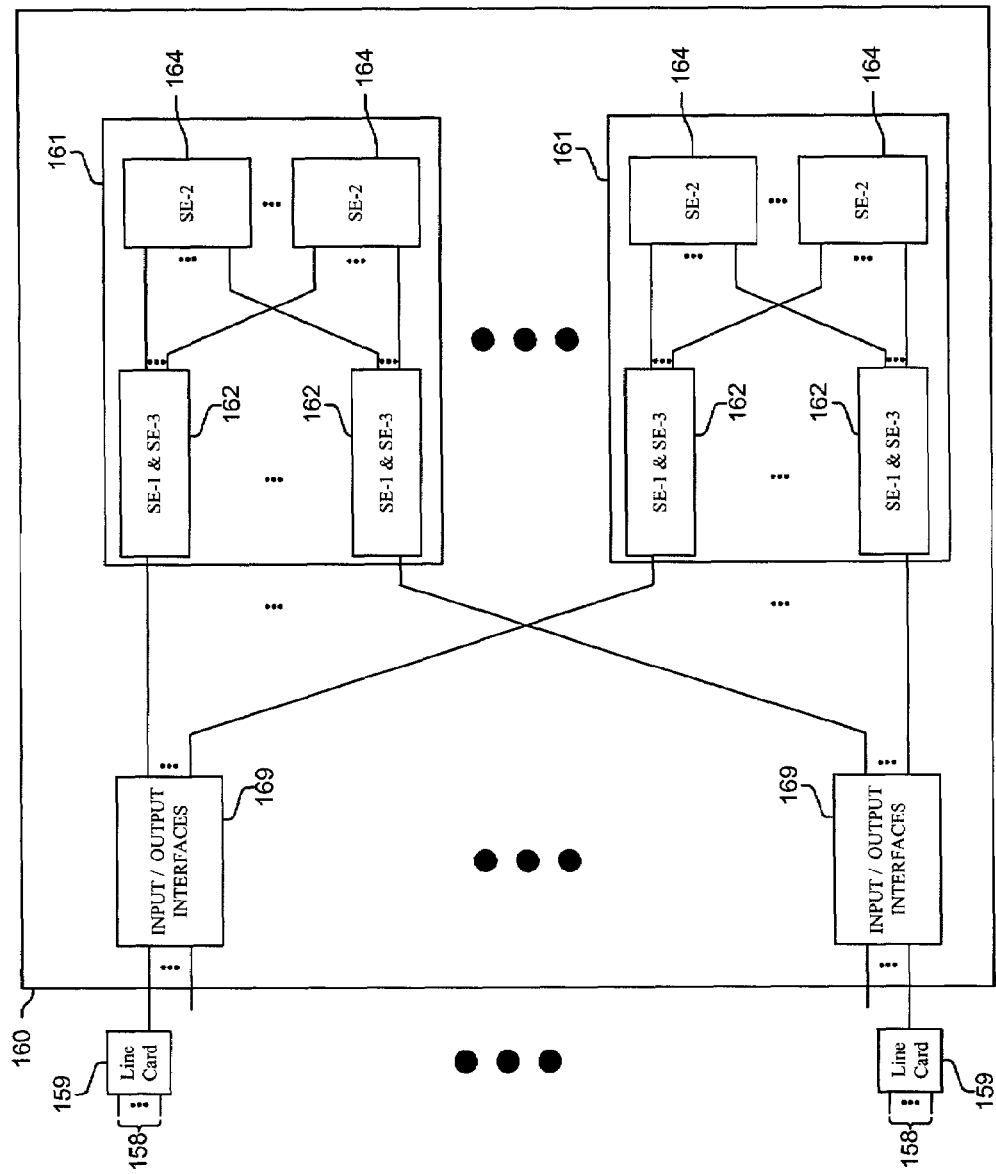

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Embodiments distribute information according to the invention in one or more components, including line cards 159, input and output interfaces 169, switch elements SE-1 & SE-3 162 and SE-2 164, and/or other locations within packet switch 160 or the packet switching system.

Figure 2A:
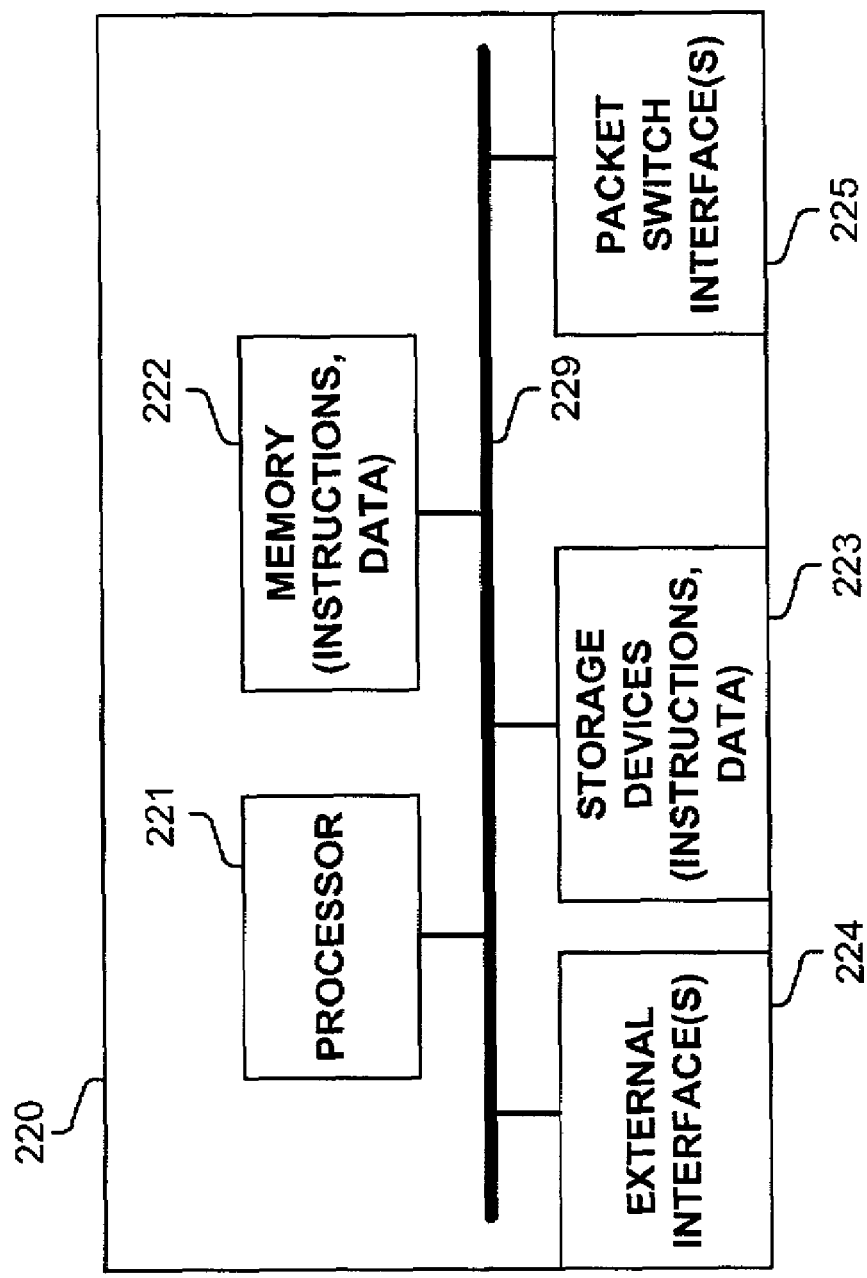
FIGS. 2A–C are block diagrams of exemplary embodiments of packet switching system components, such as, for example, a line card and/or input/output components distributing information according to the invention.
Figure 2B:
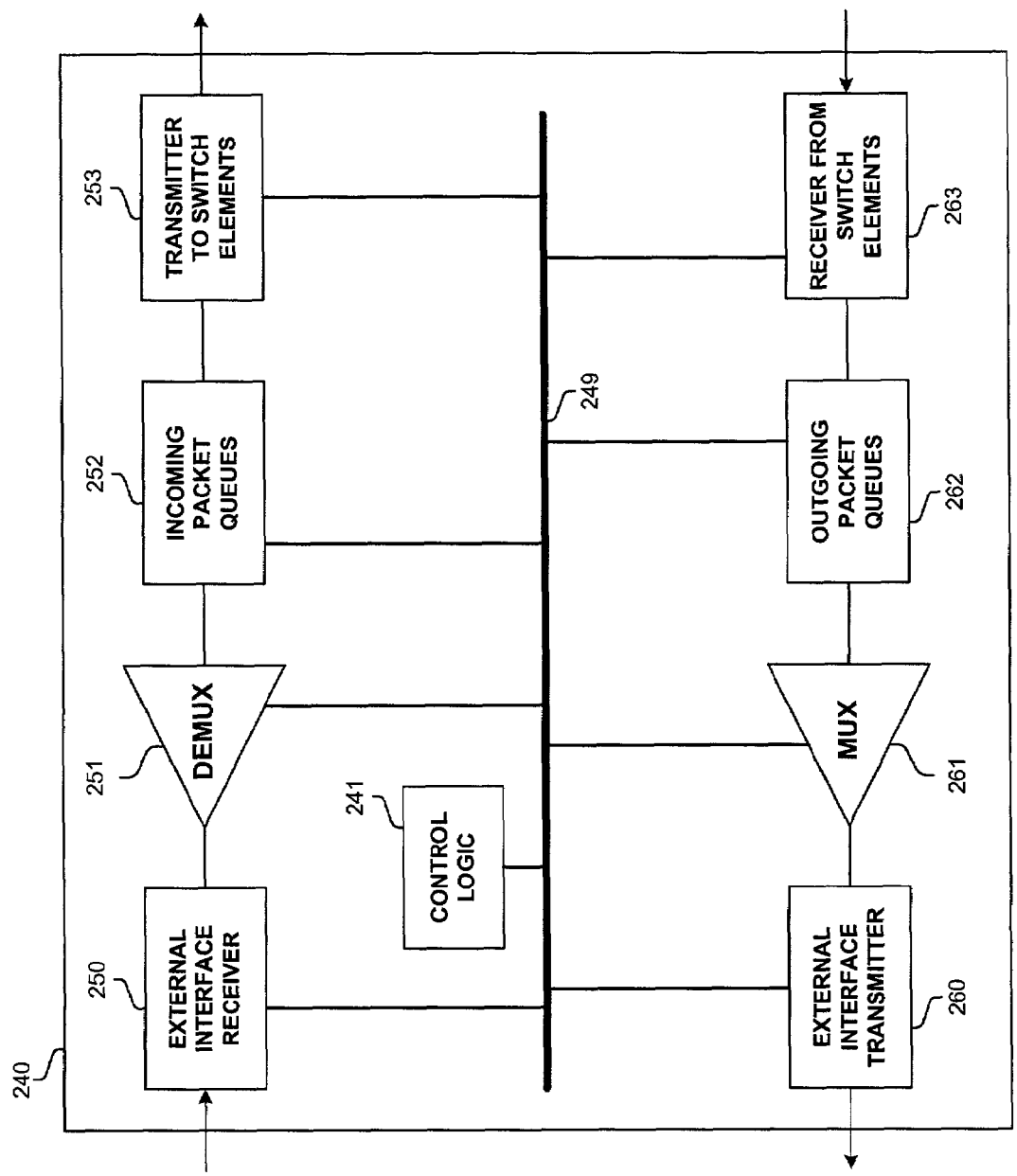
Figure 2C:
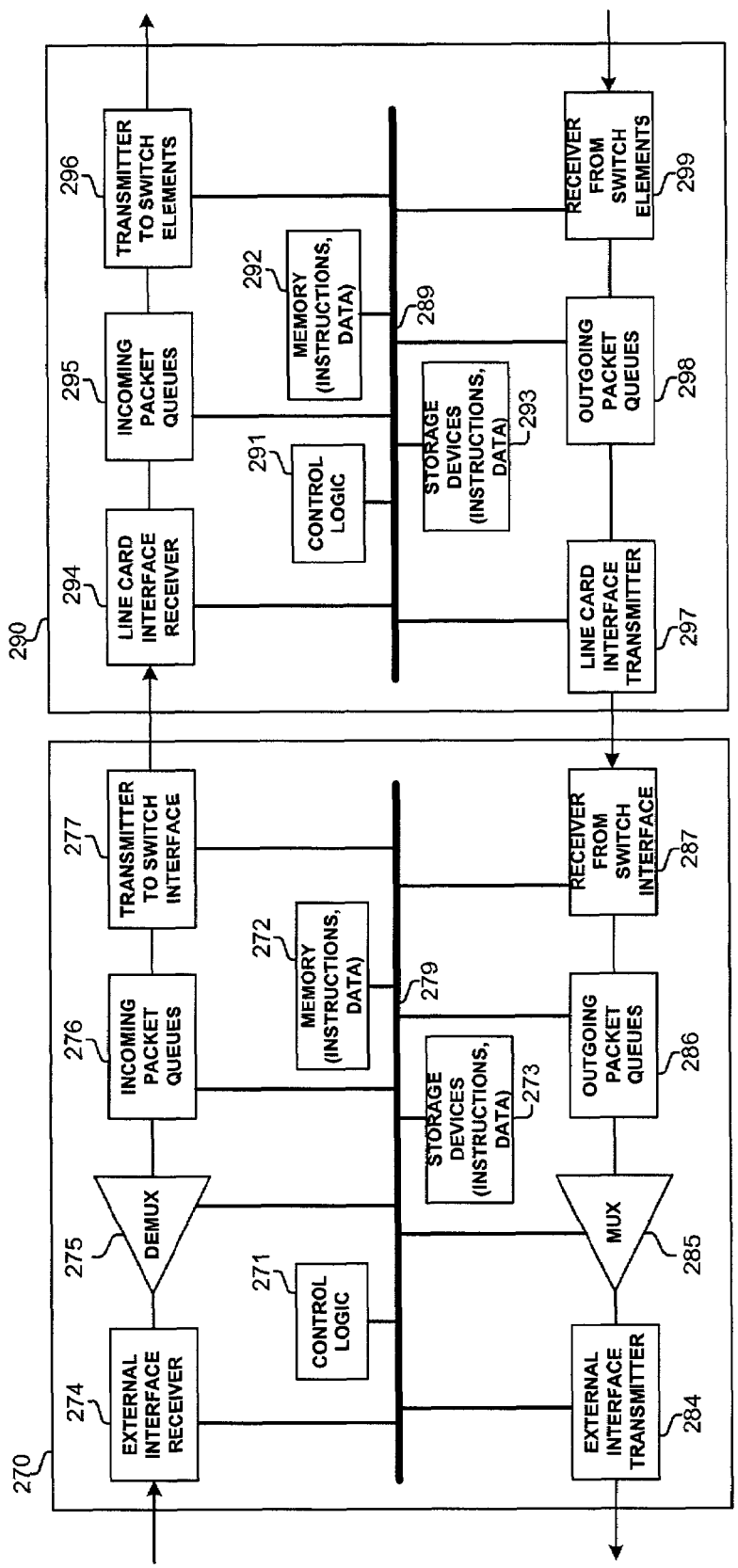

FIGS. 2A–C illustrate three of numerous possible embodiments of a line card, input interface, output interface, and/or input/output interface, which may distribute and/or consume information according to the invention. For illustrative purposes, only single transmitters and receivers may be shown. It should be clear to one skilled in the art that multiple transmitters and receivers may be used to communicate with multiple sources and destinations (e.g., line cards, switch fabrics, etc.)

FIG. 2A illustrates one embodiment 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing information distribution and consumption in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing information distribution and consumption in accordance with certain embodiments of the invention.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates embodiment 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Embodiment 240 comprises control logic 241 implementing information distribution and consumption in accordance with certain embodiments of the invention. In one embodiment control logic 241 includes memory for storage of data and instructions. Control logic 241 is connected to other components of embodiment 240 via one or more internal communications mechanisms 249 (shown as a bus for illustrative purposes). External interface receiver 250 receives external signals, separates the signals into channels using demultiplexor 251 into multiple streams of packets which are temporarily stored in incoming packet buffer 252. In one embodiment, at the appropriate time and in accordance with information distribution and consumption mechanisms disclosed herein, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexor 261 extracts the packets and creates a multiplexed signal which is transmitted via external interface transmitter 260.

FIG. 2C illustrates an embodiment of a line card 270 and a switch interface 290, which could correspond to line card 159 and input/output interfaces 169 illustrated in FIG. 2C. The embodiment of line card 270 illustrated in FIG. 2C includes control logic 271 implementing information distribution and consumption in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals 201 (FIG. 2), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexor 285 extracts the packets and creates a multiplexed signal which is transmitted via external interface transmitter 284. In one embodiment, control logic 271, referencing a data structure within control logic 271 or memory 272, to implement information distribution and consumption mechanisms.

The embodiment of input/output interface 290 illustrated in FIG. 2C includes control logic 291 implementing information distribution and consumption mechanisms in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to line card 270. In one embodiment, control logic 291, referencing a data structure within control logic 291 or memory 292, to implement information distribution and consumption mechanisms.

Figure 3A:
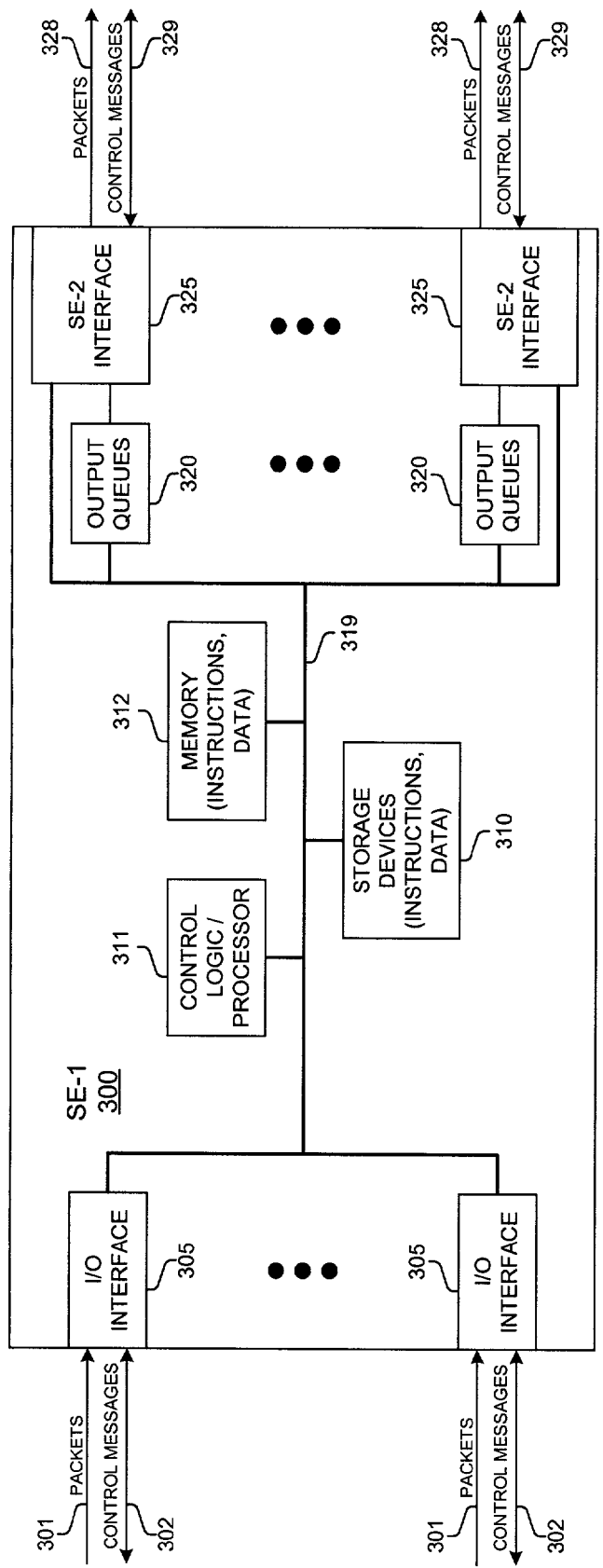
FIGS. 3A–C are block diagrams of exemplary embodiments of switching fabric components distributing information according to the invention.
Figure 3B:
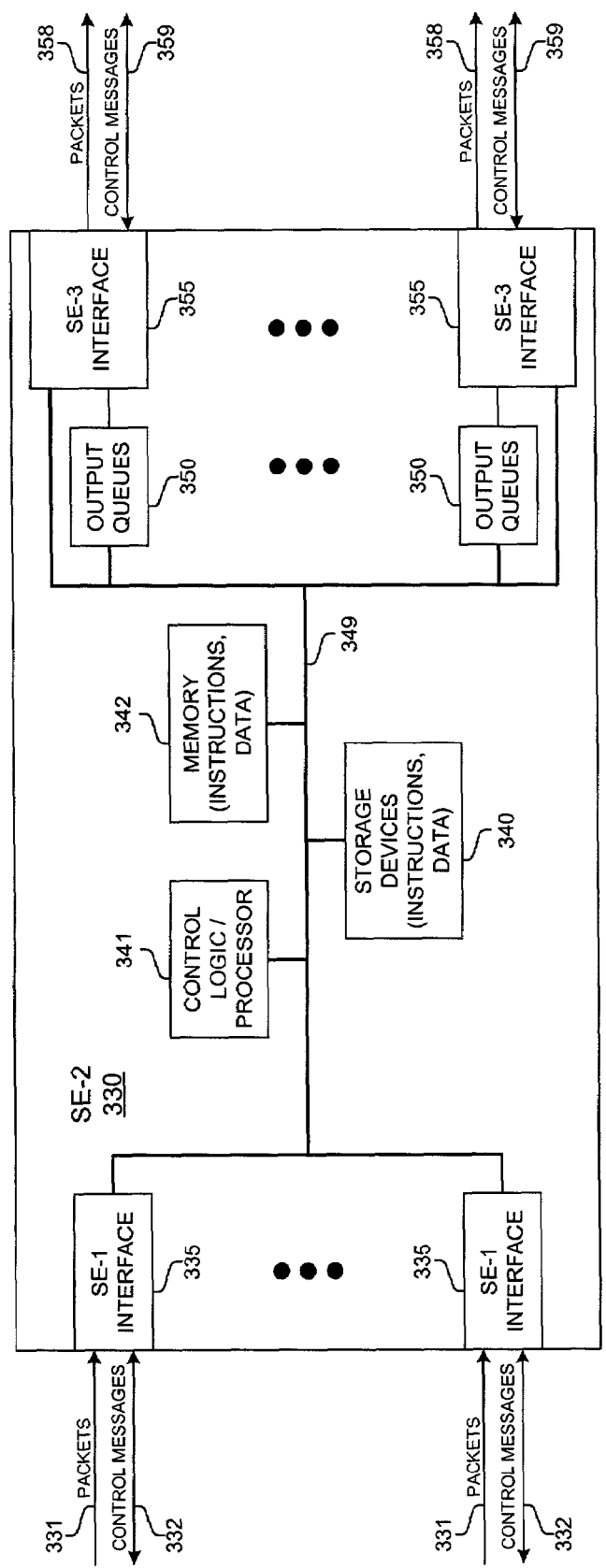
Figure 3C:
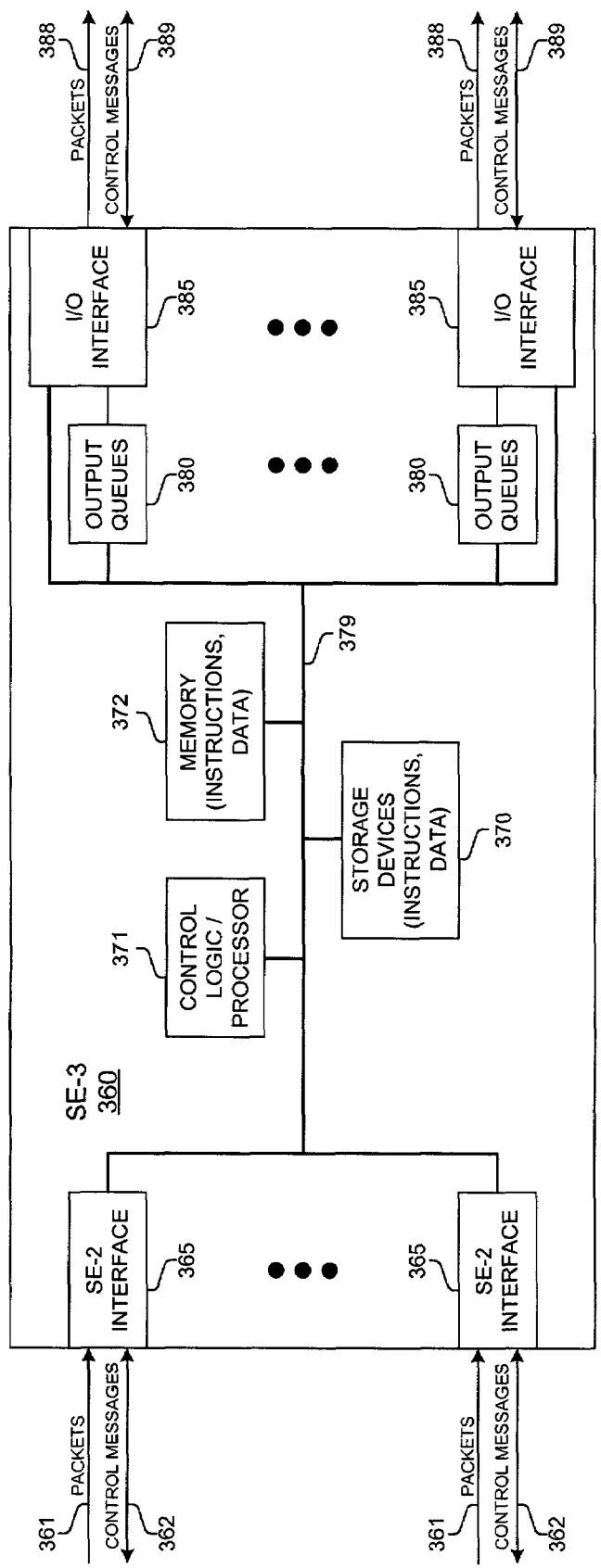

FIGS. 3A–C illustrate exemplary embodiments including switching elements and/or their components in accordance with certain embodiments of the invention for distributing information as disclosed herein, including, but not limited to the apparatus and processes described in relation to FIGS. 4A–8B, and using variants thereof which are also within the scope and spirit of the present invention. FIG. 3A is a block diagram of a first stage switching element, SE-1 300. FIG. 3B is a block diagram of a second stage switching element SE-2 330. FIG. 3C is a block diagram of a third stage switching element SE-3 360. As would be understood by one skilled in the art, the invention is not limited to these or any other embodiment described herein. Rather, the invention as described herein is extensible to an unlimited number of embodiments and implementations.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing an information distribution mechanism in accordance with certain embodiments of the invention. Storage devices 310 are another type of computer-readable medium, and typically comprise disk drives, diskettes, networked services, tape drives, and other storage devices. Storage devices 310 typically store computer-executable instructions to be executed by control logic 311 and/or data which is manipulated by control logic 311 for implementing an information distribution mechanism in accordance with certain embodiments of the invention.

Each SE-1 300 receives packets 301 and exchanges control messages 302 over one or more links with one or more input interfaces (not shown) such as input/output interface 290 (FIG. 2C) via I/O interfaces 305. In other embodiments, data packets and control messages are transmitted over a common link or links, and/or communication interfaces have a folded topology. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 may be used to implement an information distribution mechanism scheme. Outgoing packets and control messages are placed in output queues 320. In one embodiment, there is an output queue 320 for each destination, or for each class of service for each destination. In one embodiment, each output queue 320 implements an information distribution mechanism according to the invention. In one embodiment, each input and/or output interface 305, 325 implements an information distribution mechanism according to the invention.

FIG. 3B illustrates an embodiment of SE-2 330 comprising control logic and/or processor 341 (hereinafter "control logic"), memory 342, storage devices 340, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing an information distribution mechanism in accordance with certain embodiments of the invention. Storage devices 340 are another type of computer-readable medium, and typically comprise disk drives, diskettes, networked services, tape drives, and other storage devices. Storage devices 340 typically store computer-executable instructions to be executed by control logic 341 and/or data which is manipulated by control logic 341 for implementing functionality in accordance with certain embodiments of the invention.

Each SE-2 330 receives packets 331 and exchanges control messages 332 over one or more links with one or more SE-1 elements (not shown) such as SE-1 300 (FIG. 3A) via SE-1 interfaces 335. In other embodiments, data packets and control messages are transmitted over a common link or links, and/or communication interfaces have a folded topology. For example, the communications functions of SE-1 interface 335 and SE-3 interface 355 could be combined, which is particularly useful in an embodiment where SE-1 300 (FIG. 3A) and SE-3 360 (FIG. 3C) are implemented on a single component. (e.g., chip or circuit board). Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1 300 and (b) SE-2 330 and SE-3 360 are the same links. Control logic 341 may implement an information distribution mechanism. Outgoing packets and control messages are placed in output queues 350. In one embodiment, there is an output queue 350 for each destination, or for each class of service for each destination. In one embodiment, each output queue 350 implements an information distribution mechanism according to the invention. In one embodiment, each input and/or output interface 335, 355 implements an information distribution mechanism according to the invention.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality in accordance with certain embodiments of the invention. Storage devices 370 are another type of computer-readable medium, and typically comprise disk drives, diskettes, networked services, tape drives, and other storage devices. Storage devices 370 typically store computer-executable instructions to be executed by control logic 371 and/or data which is manipulated by control logic 371 for implementing an information distribution mechanism in accordance with certain embodiments of the invention.

Each SE-3 360 receives packets 361 and exchanges control messages 362 over one or more links with one or more SE-2 elements (not shown) such as SE-2 330 (FIG. 3B) via SE-2 interfaces 365. In other embodiments, data packets and control messages are transmitted over a common link or links, and/or communication interfaces have a folded topology. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing information, and updates its data structure stored in memory 372. In one embodiment, there is an output queue 380 for each destination, or for each class of service for each destination. In one embodiment, each output queue 380 implements an information distribution mechanism according to the invention. In one embodiment, each input and/or output interface 365, 385 implements an information distribution mechanism according to the invention.

FIGS. 4A–D depict one embodiment of a packet switching system 400 implementing an information distribution mechanism according to the invention. The architecture of this illustrated switching fabric 400 is first described, which is then followed by a description of the accumulation and distribution of information. Although certain particular references herein are made to "flow control" information, the teachings and embodiments of the invention include all types of control and data information. Moreover, the invention is not limited to the particular switching fabric 400. Rather, the invention is extensible and FIGS. 4A–D illustrate the operation of one of an unlimited number of embodiments. The teachings of the invention and this particular embodiment may be adapted for other switching implementations, architectures, and computer and communications systems.

FIGS. 4A–D illustrate a packet switching fabric having multiple I/O interfaces 410A–P. Note, the illustration of the topology of packet switching fabric 400 represents the same I/O interfaces 410A–P on both the left and right sides of the figures for simplicity of illustration and ease of understanding, rather than drawing links back to one representation of I/O interfaces 410A–P. Also, switch elements SE-1 411A–D and SE-3 413A–D are illustrated separately; however in certain embodiments such as that illustrated in FIG. 1C, some of these switching elements 41 1A–D and 413A–D may be implemented in the same component. Moreover, other embodiments employ a different packet switch topology, such as, but not limited to a non-folded network, which provides some mechanism to convey flow control and other information from the output or egress portion of the packet switch back to the input or ingress portion.

In general, first stage switching elements 411A–D include a data structure (DS) 422A–D for storing received flow control information. For example, using any technique, flow control information is received from sources internal to packet switching system 400, including from I/O interfaces 410A–P and/or their connected devices (not shown). The transmission of this flow control information to the traffic sources and/or other consumers is described in relation to FIGS. 4A–D, which show one embodiment of a set of paths over which flow control information is forwarded to I/O interfaces 410A–P.

The paths or routes that flow control information is distributed in FIGS. 4A–D are exemplary, and not limiting. Moreover, FIGS. 4A–D should be considered in conjunction with each other as the illustrated paths over which flow control information is transmitted according to the invention are selected to eliminate redundant flow control information arriving at the traffic sources or other destinations, and to minimize or eliminate the use of the same path by other switching elements, except, of course, where there are less paths to a next destination than flow control information sources (e.g., between third stage switching elements 413A–D and I/O interfaces 410A–P).

Figure 4A:
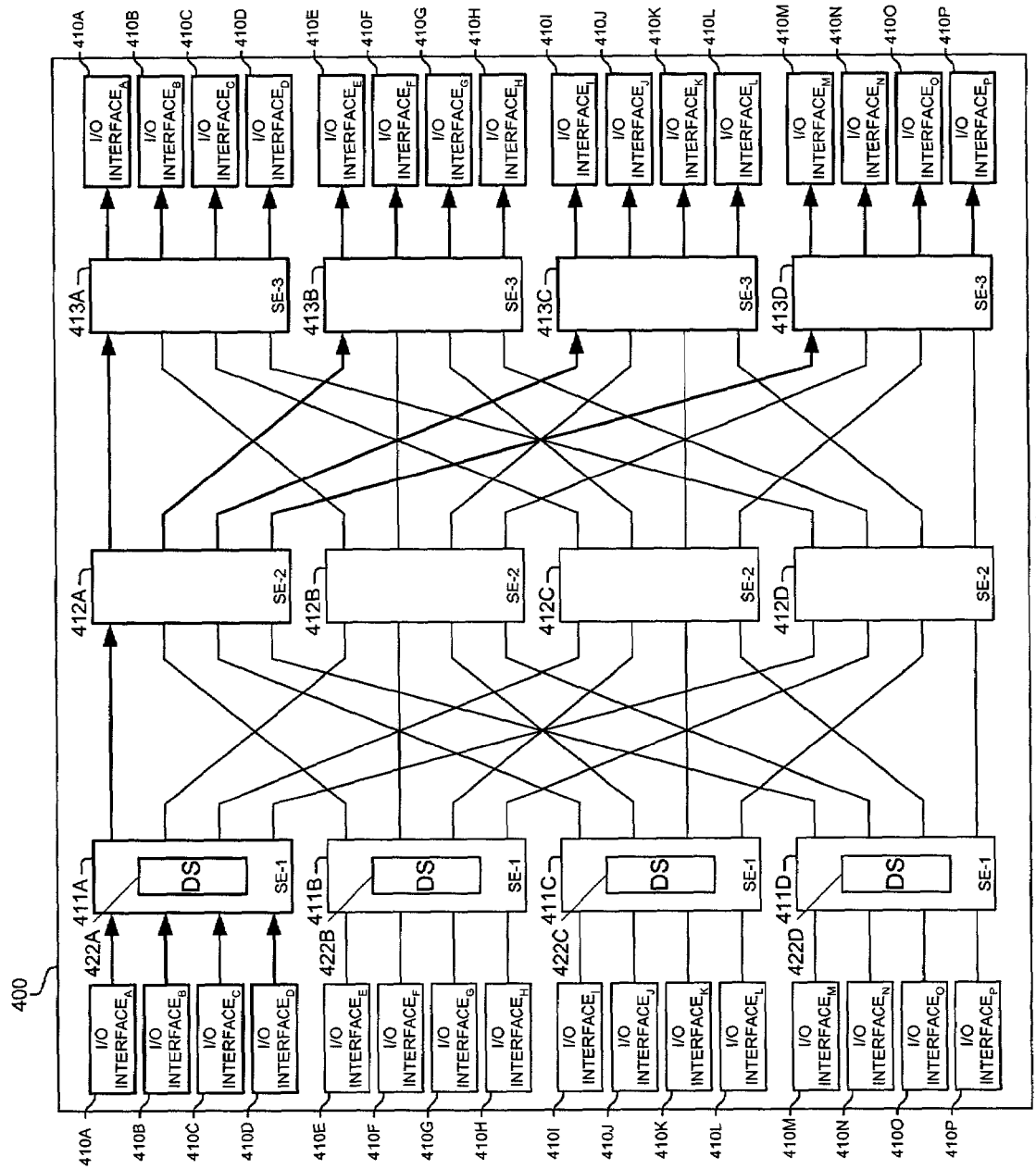
FIGS. 4A–D are block diagrams illustrating one embodiment of distributing information within a packet switching fabric.

In one embodiment shown in FIG. 4A, first stage switching element 411A receives flow control information from connected I/O interfaces 410A–D and stores this information in data structure 422A. The source of the flow control information received from I/O interfaces 410A–D may be from any source internal to or external to packet switching system 400. Periodically, first stage switching element 411A extracts a portion of the flow control data structure 411A, and sends it over a path to a predetermined or programmed one of the second stage switching elements 412A–D, in this example to second stage switching element 412A. In one embodiment, first stage switching element 411A transmits the flow control information to all second stage switching elements 412A–D, and only the designated second switching element (SE-2 412A in this particular example), forwards the information to a next stage. As flow control information is being distributed in this example to all I/O interfaces 410A–P, second stage switching element 412A must broadcast the flow control information to all third stage switching elements 413A–D, which then forwards this information to all I/O interfaces 410A–P.

Figure 4B:
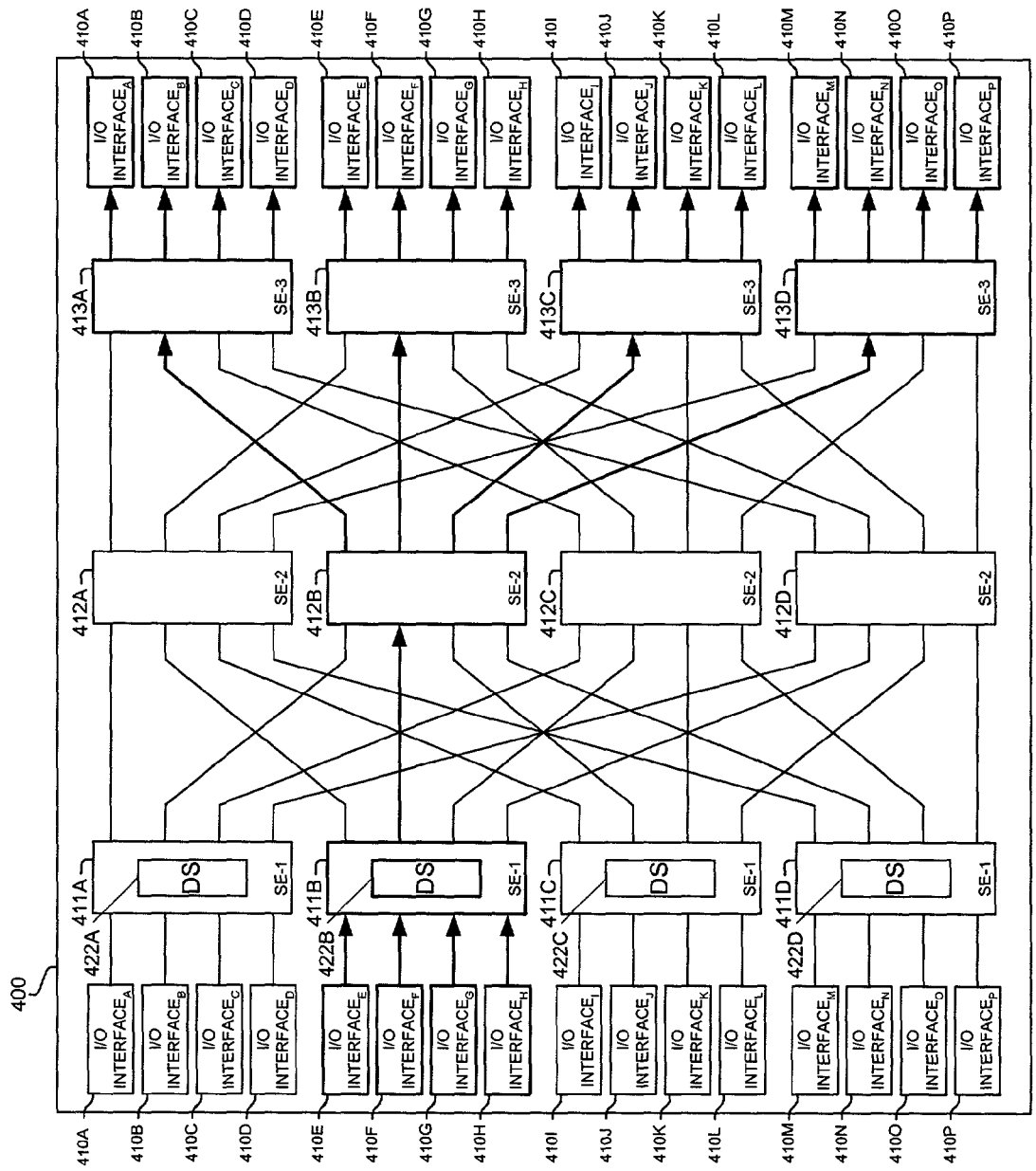

Similarly, in one embodiment shown in FIG. 4B, first stage switching element 411B receives flow control information from connected I/O interfaces 410E–H and stores this information in data structure 422B. The source of the flow control information received from I/O interfaces 410E–H may be from any source internal to or external to packet switching system 400. Periodically, first stage switching element 411B extracts a portion of the flow control data structure 411B, and sends it over a path to a predetermined or programmed one of the second stage switching elements 412A–D, in this example to second stage switching element 412B. In one embodiment, first stage switching element 411B transmits the flow control information to all second stage switching elements 412A–D, and only the designated second switching element (SE-2 412B in this particular example), forwards the information to a next stage. As flow control information is being distributed in this example to all I/O interfaces 410A–P, second stage switching element 412B must broadcast the flow control information to all third stage switching elements 413A–D, which then forwards this information to all I/O interfaces 410A–P.

Figure 4C:
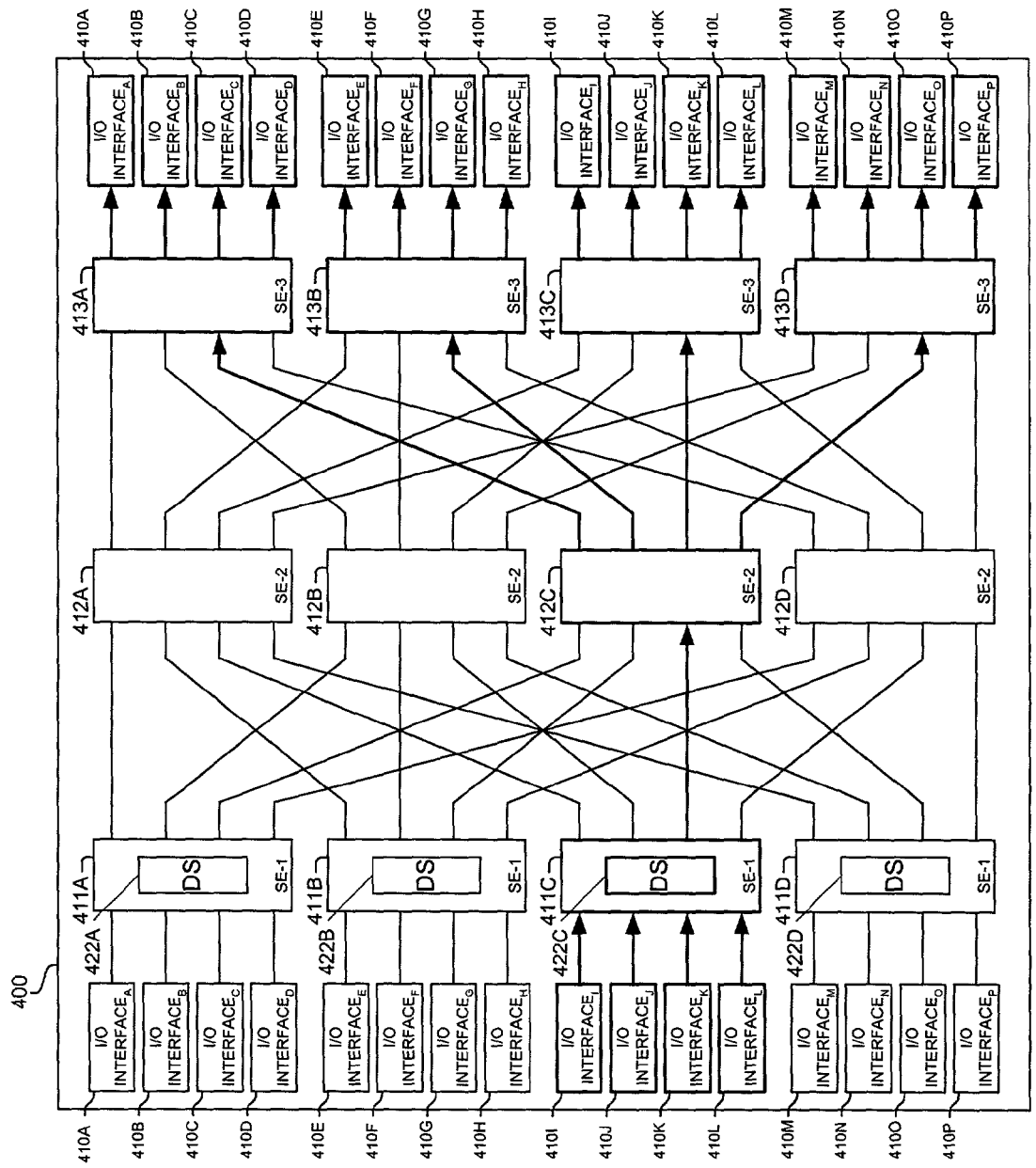

Similarly, in one embodiment shown in FIG. 4C, first stage switching element 411C receives flow control information from connected I/O interfaces 4101-L and stores this information in data structure 422C. The source of the flow control information received from I/O interfaces 4101-L may be from any source internal to or external to packet switching system 400. Periodically, first stage switching element 411C extracts a portion of the flow control data structure 411C, and sends it over a path to a predetermined or programmed one of the second stage switching elements 412A–D, in this example to second stage switching element 412C. In one embodiment, first stage switching element 411C transmits the flow control information to all second stage switching elements 412A–D, and only the designated second switching element (SE-2 412C in this particular example), forwards the information to a next stage. As flow control information is being distributed in this example to all I/O interfaces 410A–P, second stage switching element 412C must broadcast the flow control information to all third stage switching elements 413A–D, which then forwards this information to all I/O interfaces 410A–P.

Figure 4D:
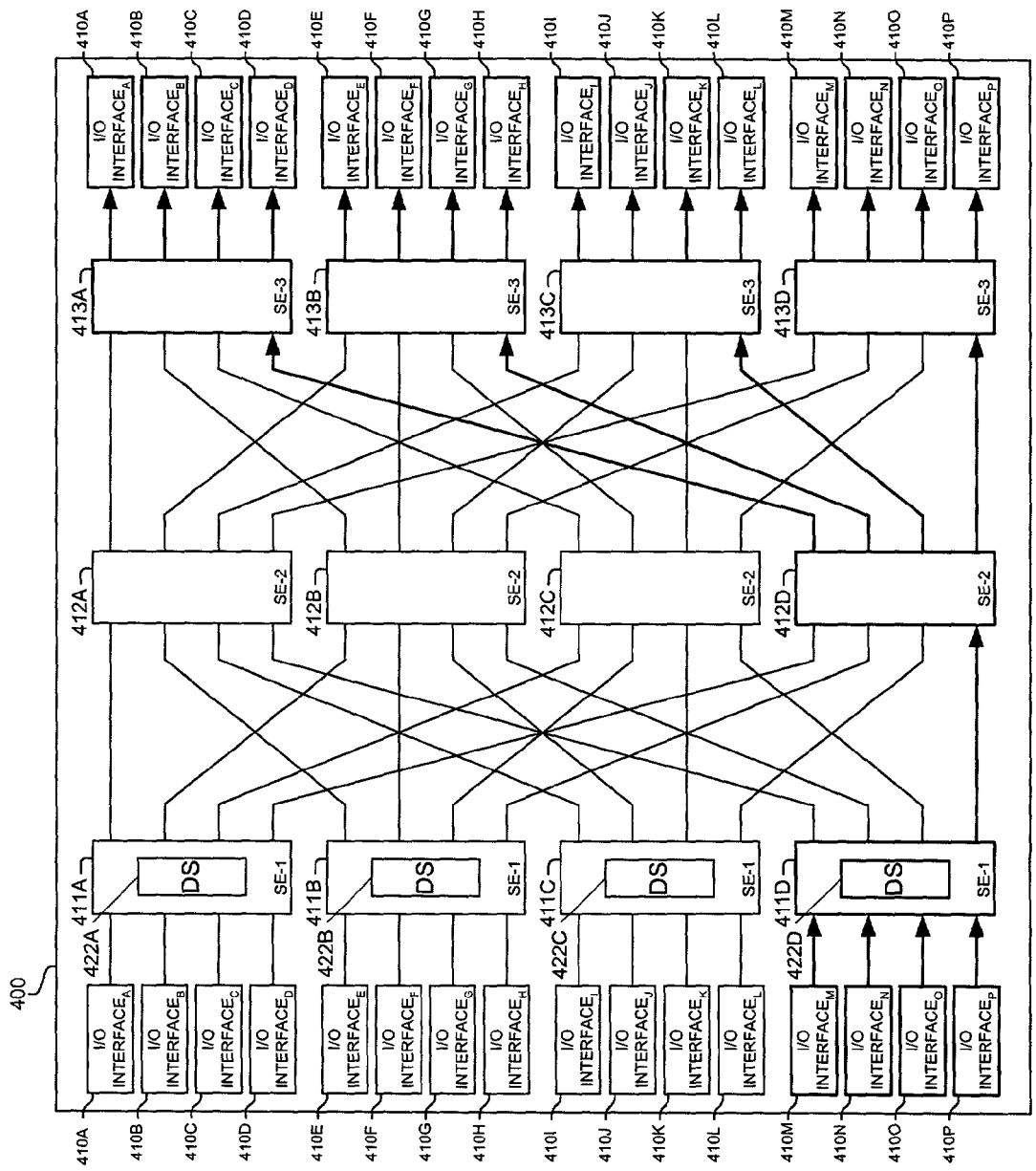

Similarly, in one embodiment shown in FIG. 4D, first stage switching element 41D receives flow control information from connected I/O interfaces 410M–P and stores this information in data structure 422D. The source of the flow control information received from I/O interfaces 410M–P may be from any source internal to or external to packet switching system 400. Periodically, first stage switching element 411D extracts a portion of the flow control data structure 411D, and sends it over a path to a predetermined or programmed one of the second stage switching elements 412A–D, in this example to second stage switching element 412D. In one embodiment, first stage switching element 411D transmits the flow control information to all second stage switching elements 412A–D, and only the designated second switching element (SE-2 412D in this particular example), forwards the information to a next stage. As flow control information is being distributed in this example to all I/O interfaces 410A–P, second stage switching element 412D must broadcast the flow control information to all third stage switching elements 413A–D, which then forwards this information to all I/O interfaces 410A–P.

Figure 5A:
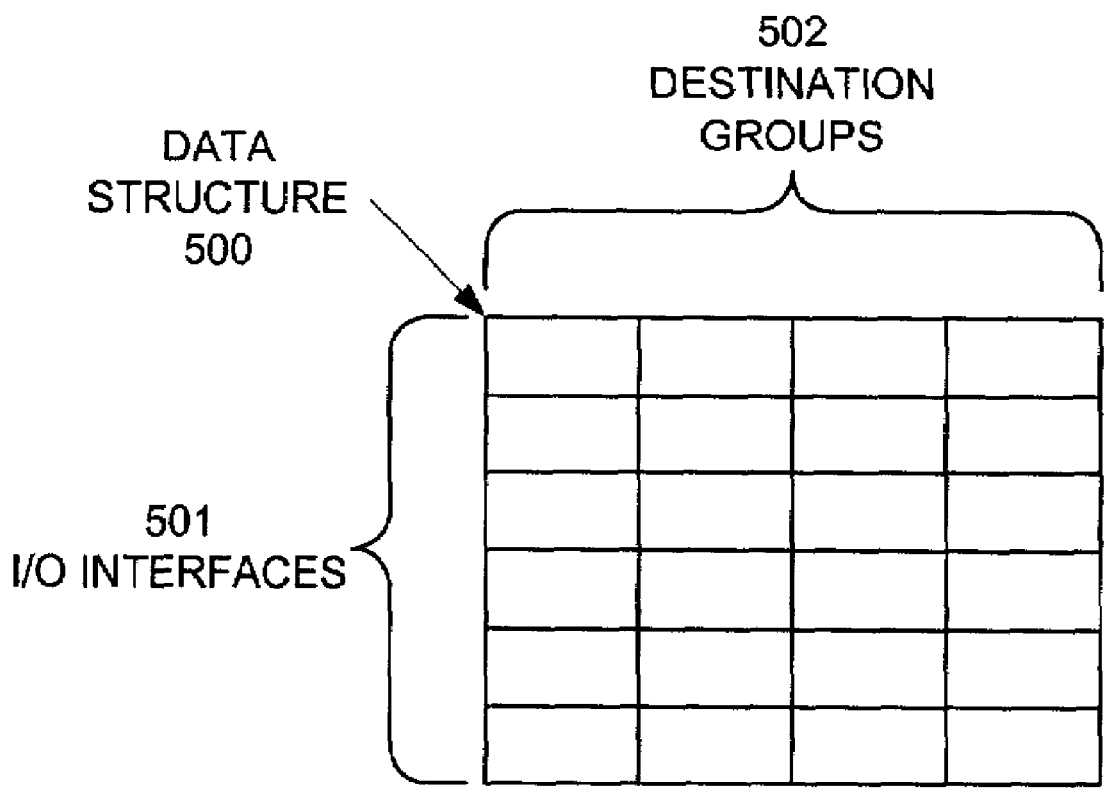
FIG. 5A is a block diagram of a data structure for accumulating information.

FIG. 5A illustrates an exemplary data structure 500, which, in one embodiment, corresponds to data structures 422A–D (FIGS. 4A–D). Data structure 500 is comprised of rows of I/O interfaces 501 and columns of groups of destinations 502, wherein a destination group corresponds to all the I/O interfaces connected to a particular first and third stage switching component. In one embodiment, a simple binary flag is used to indicate an XON or XOFF condition, while in other embodiments, an index, such as a numerical value, is used to indicate a level of traffic.

Different forms of data structures are used in different embodiments, including, but not limited to linked lists, trees, etc. Also, information is stored in data structures used in different embodiments, including for example, but not limited to source and destination pairings of control information. In one embodiment, a simple binary flag is used to indicate an XON or XOFF condition between as source-destination pair, while in other embodiments, an index, such as a numerical value, is used to indicate a level of traffic between a source-destination pair.

Figure 5B:
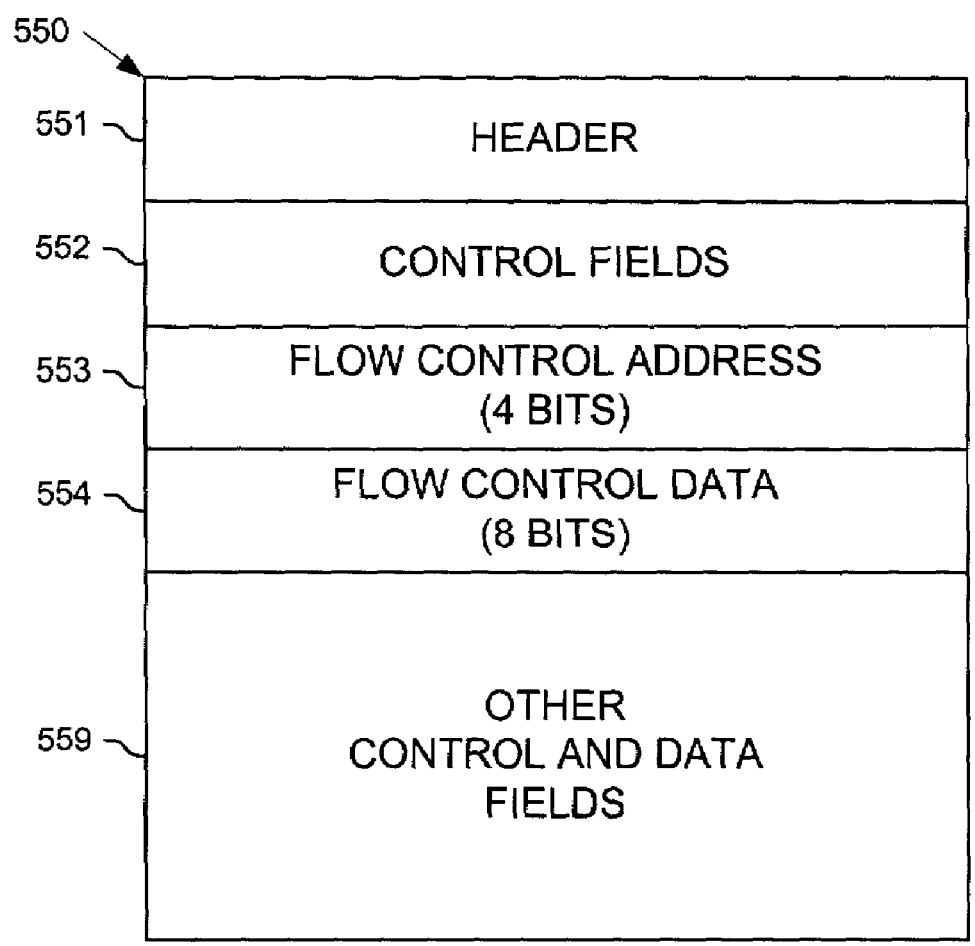
FIG. 5B is a block diagram of fields used in one embodiment to distribute information.

FIG. 5B illustrates an exemplary embodiment of a packet 550 used to distribute flow control information. As shown, packet 550 includes a header field 551, control field 552, a flow control address 553 used to indicate a context of the flow control information (e.g., to what source-destination pair or pairs the information belongs, or a position within a flow control data structure such as data structure 500 illustrated in FIG. 5A), flow control data field 554, and possibly other control and data fields 559. In one embodiment, only flow control information is included in packet 550. In one embodiment, flow control information is piggybacked in packets 550 which contain other information. In one embodiment, the flow control address field 553 only contains a portion of the address of the information received in flow control data field 554, wherein the remainder of the address may be determined based on the path or from which element packet 550 was received. In one embodiment, flow control address field 553 indicates a start of sequence or sequences of information, and the actual flow address may be inferred by the receipt number in a predetermined sequence of received packets 550. In one embodiment, other control and data fields 559 contains error detection and/or error correction information.

Figure 6A:
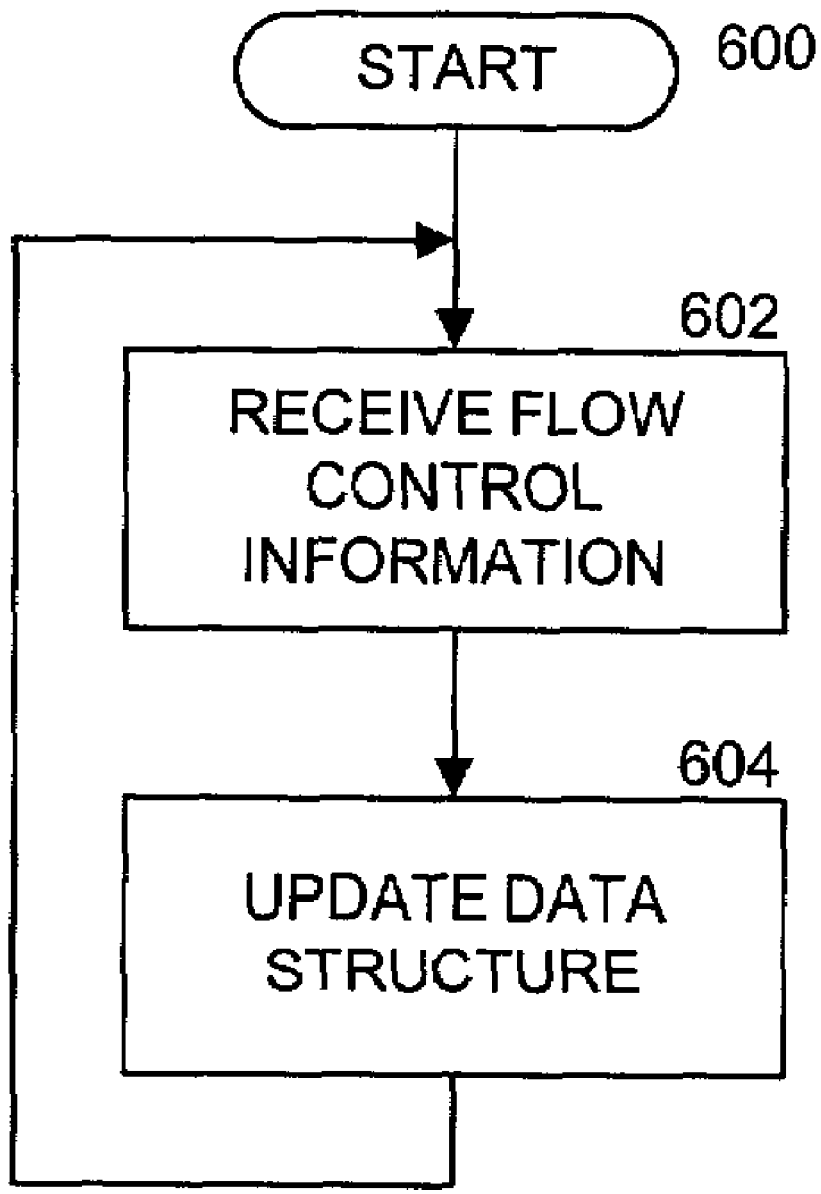
FIGS. 6A–B are flow diagrams of processes performed by a component in one embodiment for accumulating and distributing information.

FIG. 6A illustrates a process of one embodiment used by a component of one embodiment to update its flow control data structure. This component of the packet switching system is typically determined based on the topology of the packet switching system. For example, in a non-folded Benes network, this component is typically a first stage switching element. Processing begins at process block 600, and proceeds to process block 602, wherein flow control information is received (e.g., via signals, messages, packets, etc.). In process block 604, this flow control information is used to update (e.g., replace or modify current data) the flow control data structure, and processing returns to process block 602.

Figure 6B:
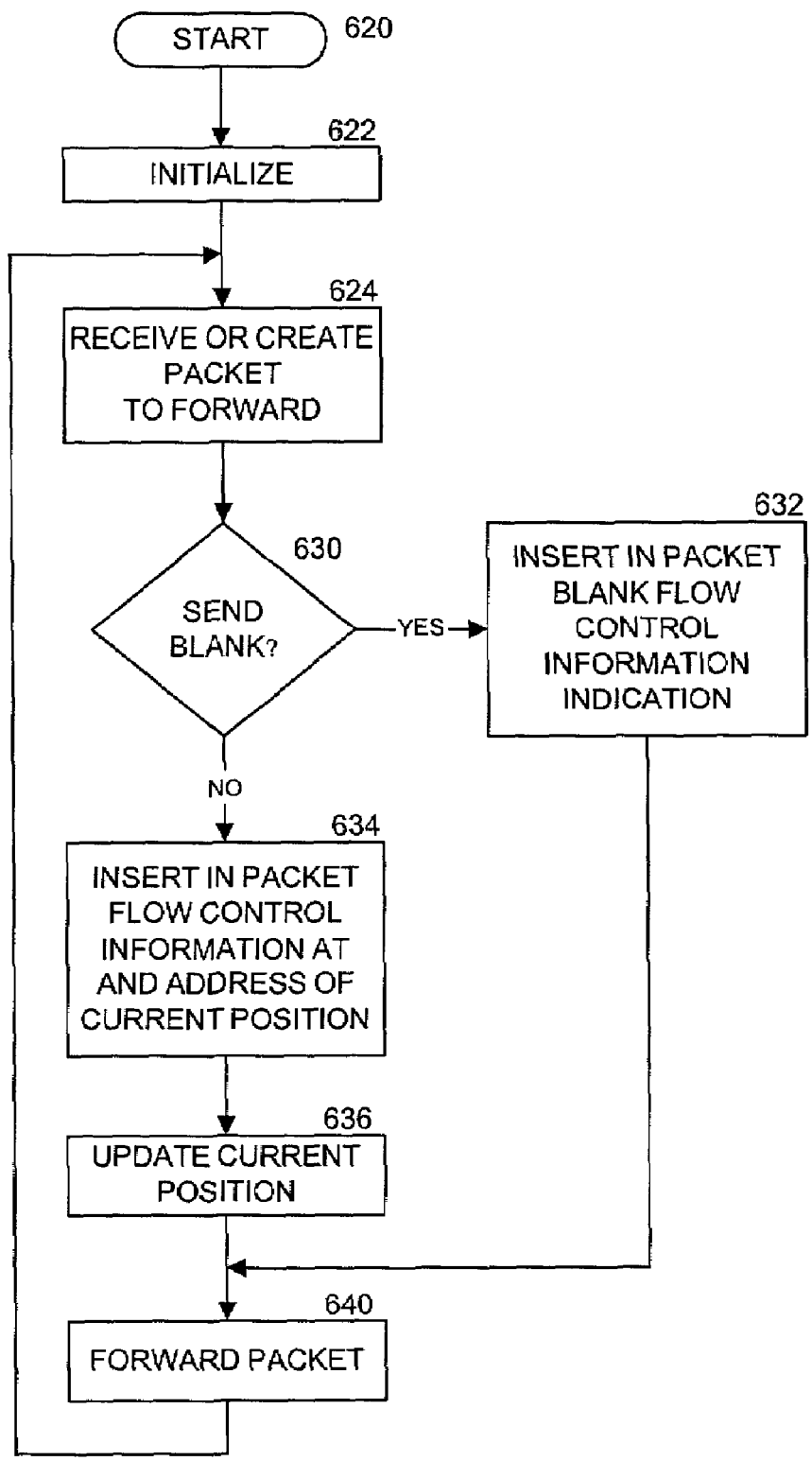

FIG. 6B illustrates a process of one embodiment used to forward flow control information collected in its data structure. Processing begins at process block 620, and proceeds to process block 622, wherein the process is initialized, which may include initializing a current position within the data structure, etc. Next, in process block 624, a packet to forward is received or created, which typically depends on whether the embodiment piggybacks flow control information or send flow control information in created packets. Next, as determined in process block 630, if it is time to send a blank flow control information (e.g., so as to not send flow control information at a maximum rate so as to allow for variations in bandwidth and timing between components), then in process block 632, a blank flow control indication is inserted in the packet. Otherwise, in process block 634, the flow control information at the current position within the flow control data structure is inserted into the packets (e.g., into flow control address and data fields 553 and 554 of FIG. 5B), and in process block 636, the current position is advanced. Next in process block 640, the packet is forwarded to a next component, typically to all components for simplicity of implementation and handling of error conditions, or possibly only to one or more designated next components.

Figure 7A:
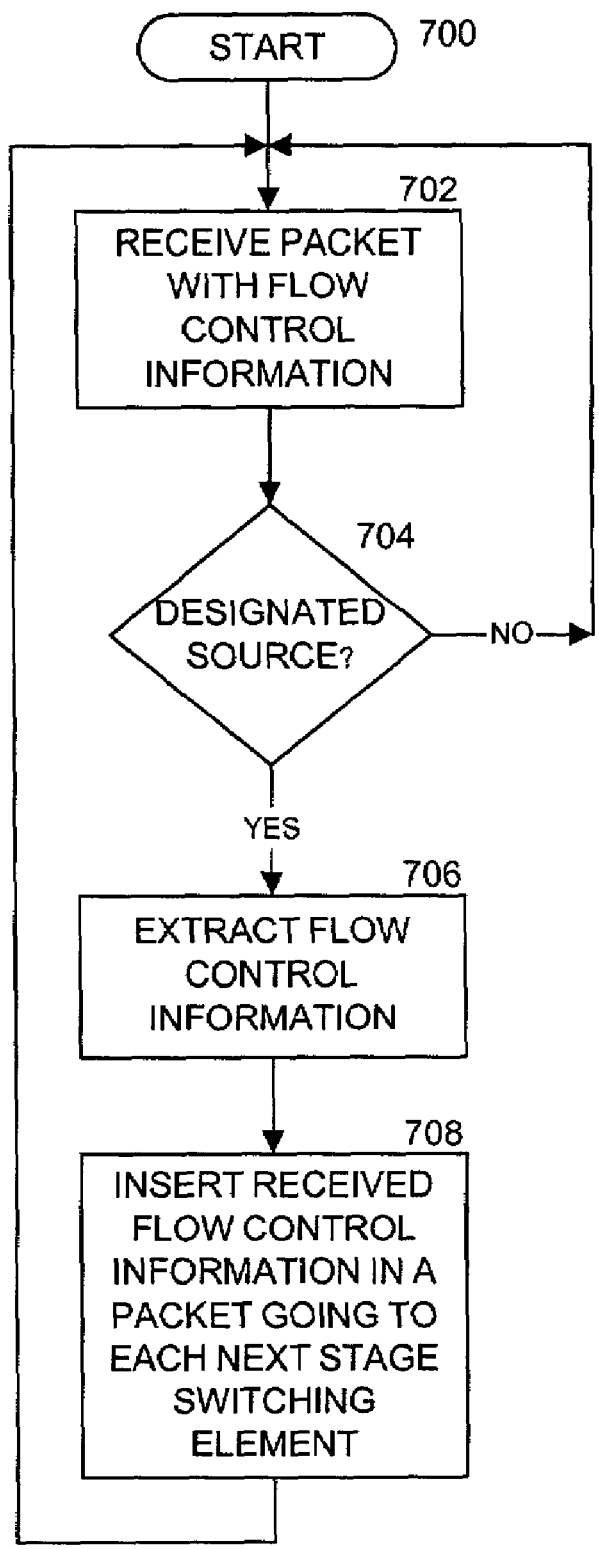
FIGS. 7A–B are flow diagrams of processes for distributing information performed by an intermediate switching node in one embodiment.

FIG. 7A illustrates a process used by an intermediate stage switching element in one embodiment. Processing begins at process block 700, and proceeds to process block 702, wherein a packet with flow control information is received. Next, as determined in process block 704, if the flow control information came from a designated source, then in process block 706 the flow control information is extracted, and in process block 708, the flow control information is inserted in packets going to all next stage switching elements (or a subset thereof in one embodiment). Processing returns to process block 702.

Figure 7B:
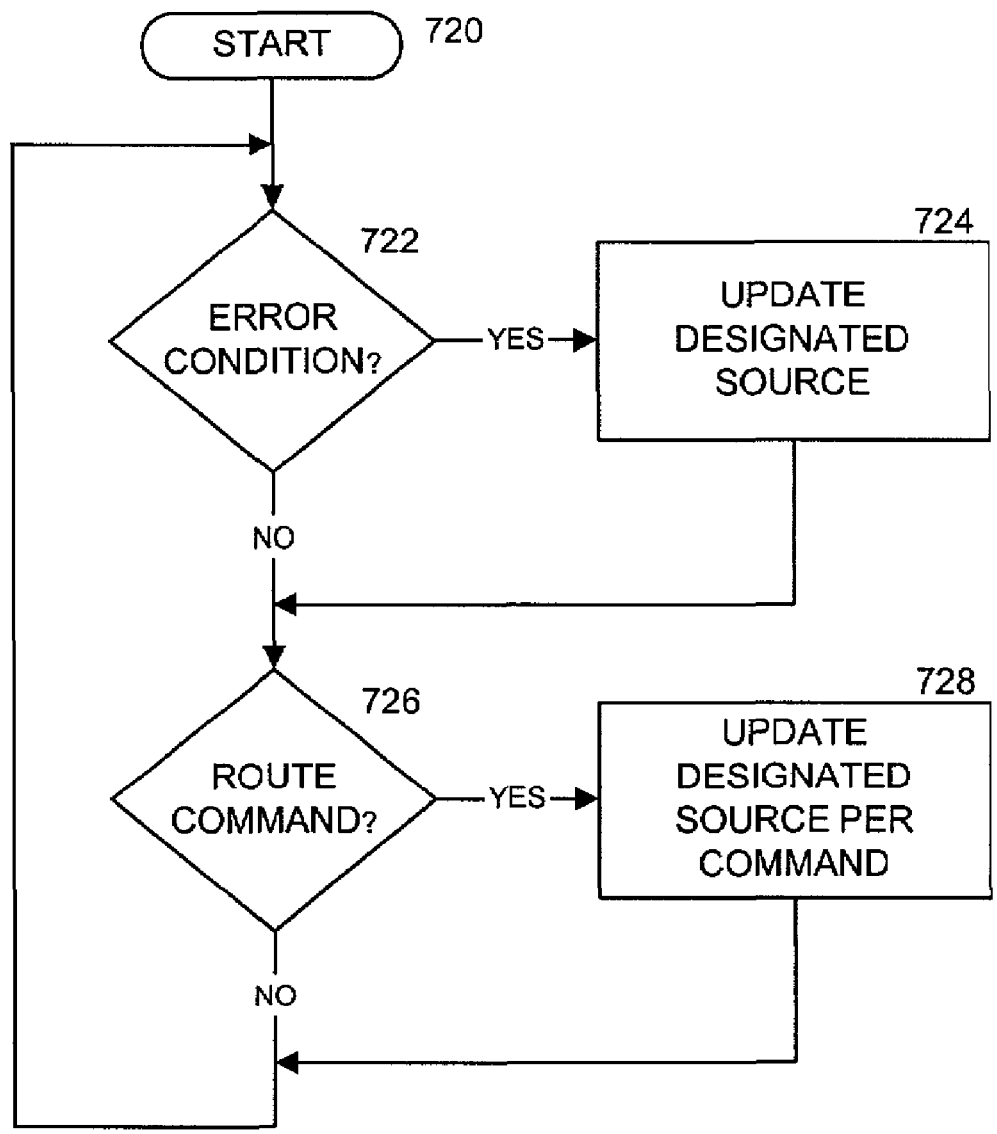

FIG. 7B illustrates a process used in one embodiment for handling error conditions and/or reconfiguration commands. Processing begins at process block 720. If, as determined in process block 722 and error condition is detected that affects the current configuration of the flow control distribution, then in process block 724, the designated source of flow control information is updated. If, as determined in process block 726, that a route update command has been received, then in process block 728, the designated source is updated per the received command in process block 728. Processing returns to process block 722.

Figure 8A:
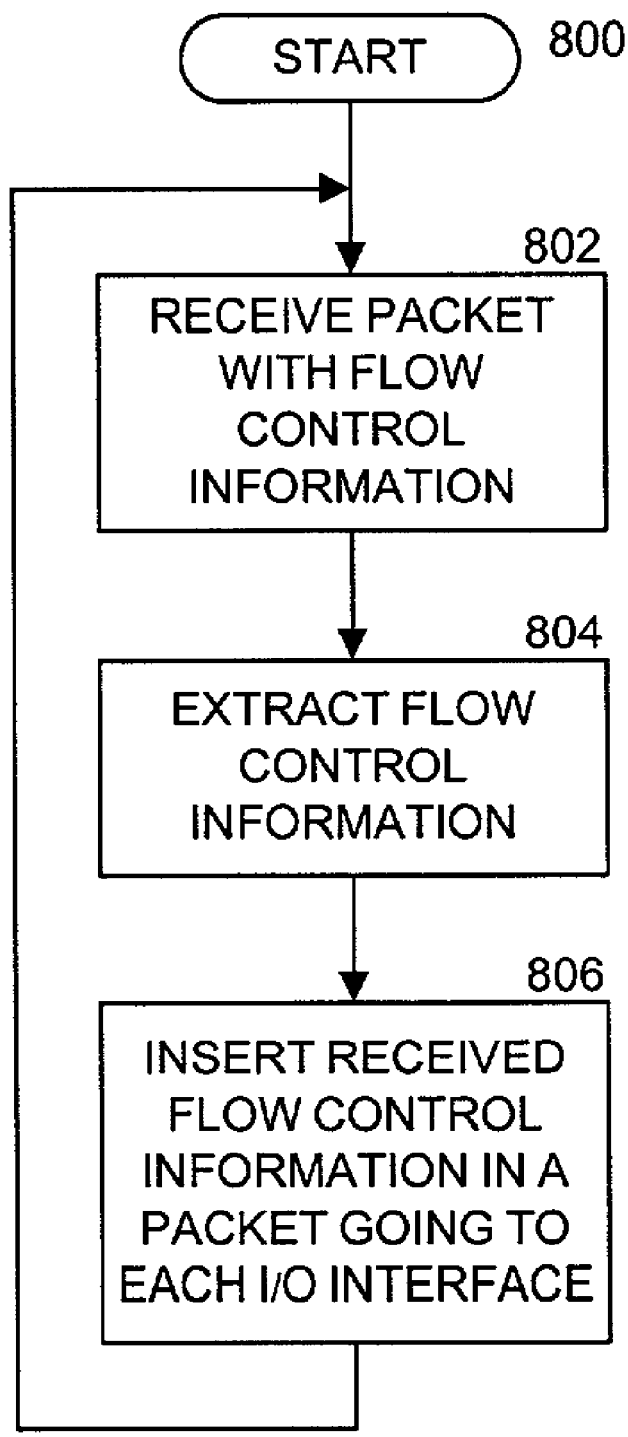
FIGS. 8A–B are flow diagrams of processes for distributing information performed by a final stage switching node in one embodiment.

FIG. 8A illustrates a process for forwarding flow control information of a final stage switching element of one embodiment. Processing begins at process block 800, and proceeds to process block 802, wherein a packet with flow control information is received. Next, in process block 804, this flow control information is extracted, and in process block 806, this flow control information is forwarded to each of the I/O interfaces and/or line cards. Processing returns to process block 802.

Figure 8B:
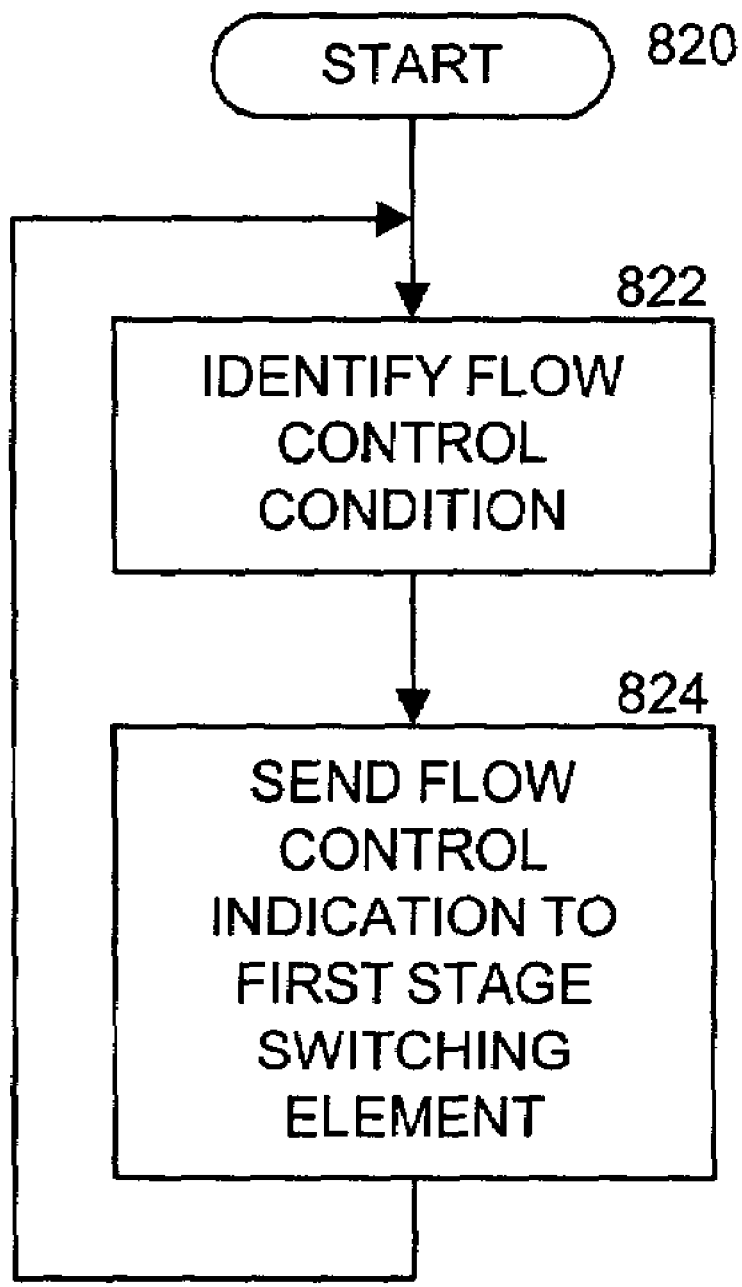

FIG. 8B illustrates a process for forwarding flow control information to a component which maintains a flow control data structure. Processing begins in process block 820, and proceeds to process block 822, wherein a flow control condition is identified (e.g., via a signal, packet, or other detection or communications mechanism). In process block 824, this flow control information is then sent to the first stage switching element (or other component) in one embodiment (and handled in one embodiment per the process illustrated in FIG. 6A). Processing returns to process block 822.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switch, comprising:
   a plurality of input/output interfaces:
   a benes switching fabric including a plurality of first stage switching elements, a plurality of second stage switching elements, and a plurality of third stage switching elements communicatively coupled via a plurality of paths according to a benes topology;
   wherein each first stage switching element of the plurality of first stage switching elements includes a flow control storage mechanism for storing received flow control information extracted from information received from the corresponding input/output interfaces of said input/output interfaces to which said first stage switching element is coupled, and control logic for receiving said information, extracting said received flow control information from said information, and for updating the storage mechanism with said received flow control information;
   wherein each of the first stage switching elements is configured to repeatedly sequence through said flow control information currently stored in the storage mechanism and to send a portion of said flow control information stored at a current location within said flow control information over one of said paths to a predetermined one of the plurality of second stage switching elements, such that each of the first stage switching elements is configured to said send said flow control information to a different one of the plurality of second stage switching elements;
   wherein each of the plurality of second stage switching elements is configured to receive and forward said portions of flow control information to each of the plurality of third stage switching elements; and
   wherein each of the plurality of third stage switching elements are configured to send said portions of flow control information to each of the plurality of input/output interfaces for performing flow control operations in response to said flow control information.

2. The packet switch of claim 1, where the flow control storage mechanism includes a flow control data structure indexed by said input/output interfaces.

3. The packet switch of claim 2, where each said information includes an address within the flow control data structure at which to store said extracted flow control information.

4. The packet switch of claim 1, wherein the packet switch is configured to re-route said sending and forwarding of said flow control information in the benes switching fabric in response to an identified error within the benes switching fabric.

5. A packet switch, comprising:
   a plurality of input/output interfaces;
   a benes switching fabric including a plurality of first stage switching elements, a plurality of second stage switching elements, and a plurality of third stage switching elements communicatively coupled via a plurality of paths according to a benes topology;
   wherein each first stage switching element of the plurality of first stage switching elements includes: means for maintaining a flow control data structure and for updating the flow control data structure with received flow control information from the corresponding input/output interfaces of said input/output interfaces to which said first stage switching element is coupled; and means for repeatedly; retrieving a portion of said flow control information currently stored in the flow control data structure and sending the portion of said flow control information over one of said paths to a predetermined one of the plurality of second stage switching elements, such that each of the first stage switching elements is configured to said send said flow control information to a different one of the plurality of second stage switching elements;
   wherein each of the plurality of second stare switching elements includes means receiving and forwarding said portions of flow control information to each of the plurality of third stage switching elements; and
   wherein each of the plurality of third stage switching elements includes means sending said portions of flow control information to each of the plurality of input/output interfaces for performing flow control operations in response to said flow control information.

6. The packet switch of claim 5, where the flow control data structure indexed by said input/output interfaces.

7. The packet switch of claim 5, where said received flow control information is accompanied by an address within the flow control data structure at which to store said flow control information.

8. The packet switch of claim 5, wherein the packet switch is configured to re-route said sending and forwarding of said flow control information in the benes switching fabric in response to an identified error within the benes switching fabric.

* * * * *

UNITED STATES PATENT AND TRADEMARK OFFICE
CERTIFICATE OF CORRECTION

PATENT NO. : 7,016,305 B1  
APPLICATION NO. : 09/894200  
DATED : March 21, 2006  
INVENTOR(S) : Michelson et al.

It is certified that error appears in the above-identified patent and that said Letters Patent is hereby corrected as shown below:

Col. 9, line 57, replace "41 1A-D" with -- 411 A-D --

Col. 10, line 64, replace "4101-L" with -- 410I-L --

Col. 10, line 66, replace "4101-L" with -- 410I-L --

Col. 11, line 17, replace "41D" with --411D --

Col. 13, line 40, replace "interfaces:" with -- interfaces; --

Col. 14, line 36, replace "repeatedly;" with -- repeatedly: --

Col. 14, line 46, replace "stare" with -- stage --

Col. 14, line 57, replace "claim 5" with -- claim 6 --

Signed and Sealed this

Fifth Day of December, 2006

JON W. DUDAS  
*Director of the United States Patent and Trademark Office*